(12) United States Patent
Tharp et al.

(10) Patent No.: US 8,931,763 B2
(45) Date of Patent: Jan. 13, 2015

(54) MODULAR DIFFUSER BODY AND AERATION SYSTEM

(75) Inventors: Charles E. Tharp, Columbia, MO (US); Randall C. Chann, Columbia, MO (US); Randy K. Hulsebus, Columbia, MO (US)

(73) Assignee: Environmental Dynamics International, Inc., Columbia, MO (US)

( * ) Notice: Subject to any disclaimer, the term of this patent is extended or adjusted under 35 U.S.C. 154(b) by 711 days.

(21) Appl. No.: 13/229,678

(22) Filed: Sep. 10, 2011

(65) Prior Publication Data

US 2012/0061862 A1 Mar. 15, 2012

Related U.S. Application Data

(60) Provisional application No. 61/381,900, filed on Sep. 10, 2010, provisional application No. 61/382,745, filed on Sep. 14, 2010.

(51) Int. Cl.
*B01F 3/04* (2006.01)
*F16L 21/06* (2006.01)

(52) U.S. Cl.
CPC ............. *B01F 3/04269* (2013.01); *F16L 21/06* (2013.01); *B01F 2003/04148* (2013.01); *B01F 2003/0417* (2013.01); *B01F 2003/04177* (2013.01); *B01F 2003/04198* (2013.01)
USPC ....................................... 261/122.1; 285/337

(58) Field of Classification Search
USPC ................... 261/122.1, 122.2, 124; 285/337
See application file for complete search history.

(56) References Cited

U.S. PATENT DOCUMENTS

| | | | |
|---|---|---|---|
| 2,757,943 A | 8/1956 | Henderson | |
| 3,933,377 A | 1/1976 | Arrowood | |
| 4,391,458 A | 7/1983 | Blakeley | |
| 4,960,546 A * | 10/1990 | Tharp | ........................ 261/122.1 |
| 5,032,325 A | 7/1991 | Tharp | |

(Continued)

OTHER PUBLICATIONS

AerResearch Wastewater Recovery Systems, http://www.aerresearch.com, 2010, AerResearch, Inc.

(Continued)

*Primary Examiner* — Charles Bushey
(74) *Attorney, Agent, or Firm* — Husch Blackwell LLP

(57) ABSTRACT

An aeration system for treating liquid contained in a vessel is provided. The aeration system includes a header pipe and a plurality of lateral pipes coupled to the header pipe. The lateral pipes each have one or more tubular diffuser membranes sleeved therearound. Also provided is a coupling for sealingly joining end portions of two adjacent pipes is provided. The coupling includes two saddle sections and a deformable gasket extending between the pipes. The coupling is adapted for enabling one pipe to be removed and replaced from a series of pipes without substantially moving any adjacent pipes.

18 Claims, 13 Drawing Sheets

(56) References Cited

U.S. PATENT DOCUMENTS

| | | | |
|---|---|---|---|
| 5,059,358 A | | 10/1991 | Tharp |
| 5,823,581 A | | 10/1998 | Coppolo |
| 5,846,412 A | * | 12/1998 | Tharp ............................ 210/220 |
| 5,851,447 A | | 12/1998 | Tyer |
| 5,868,972 A | * | 2/1999 | Galich et al. ................ 261/122.1 |
| 6,497,402 B2 | | 12/2002 | Tharp |
| 6,543,753 B1 | | 4/2003 | Tharp |
| 6,811,148 B2 | * | 11/2004 | Frankel et al. .............. 261/122.1 |
| 7,044,453 B2 | | 5/2006 | Tharp |
| 2009/0302601 A1 | * | 12/2009 | Sarkisyan et al. ............. 285/337 |
| 2010/0001521 A1 | * | 1/2010 | Vandal et al. .................. 285/337 |

OTHER PUBLICATIONS

INVENT E-Flex: The Flexible Aeration System brochure, Dec. 2011.

IFU Brochure, IFU Diffusions-Und Umwelttechnik, Bad Homburg V.D.H., Dec. 2011.

IFU Membrane Tube Diffuser, http://www.ifu-diffuser.de, IFU Diffusions-Und Umwelttechnik, Dec. 2011.

SUCOFLOW-IS: The Modular Integrated Diffuser System, Huber+Suhner Switzerland, 1999.

* cited by examiner

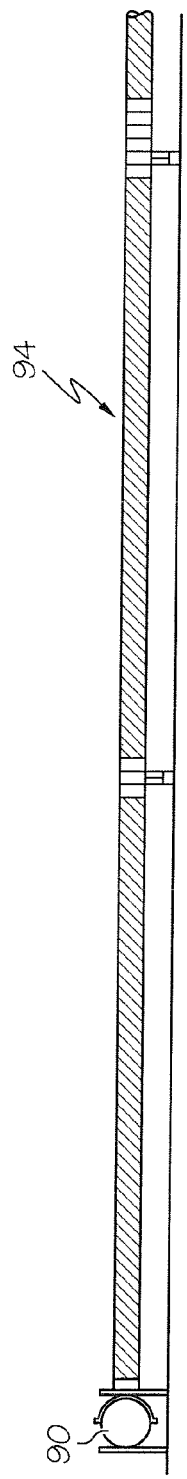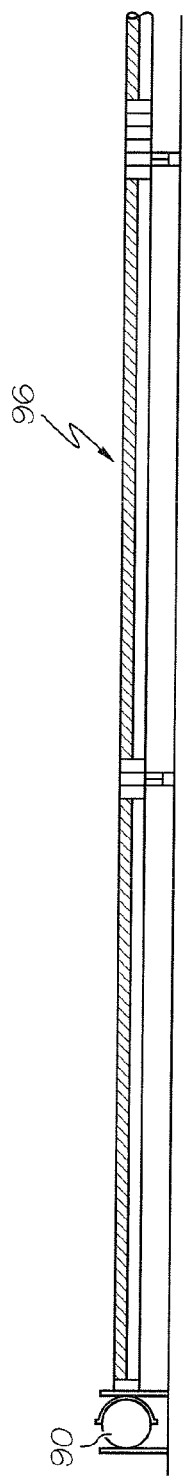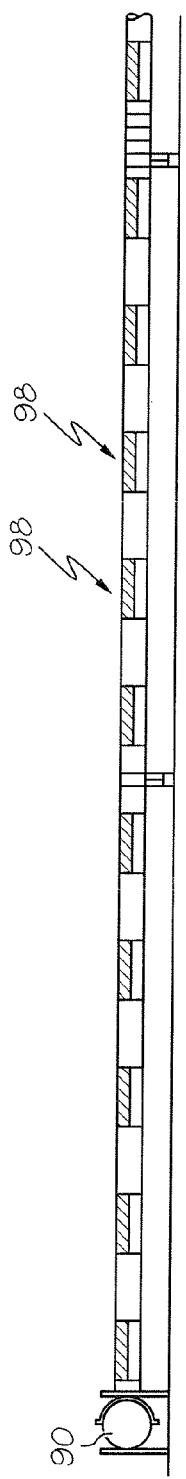

MODULAR DIFFUSER BODY AND AERATION SYSTEM

CROSS-REFERENCE TO RELATED APPLICATIONS

This Application claims priority to U.S. Provisional Patent Application Ser. No. 61/381,900 filed Sep. 10, 2010 to Charles E. Tharp and Randall C. Chann entitled "Method and Apparatus for Aerating Wastewater," the entire disclosure of which is incorporated herein by reference. This Application also claims priority to U.S. Provisional Patent Application Ser. No. 61/382,745 filed Sep. 14, 2010 to Charles E. Tharp and Randall C. Chann entitled "Method and Apparatus for Aerating Wastewater," the entire disclosure of which is incorporated herein by reference.

BACKGROUND OF THE INVENTION

In the aerobic biological treatment of wastewater and other liquids, it is common practice to provide an aeration system to oxygenate the liquid by dispersing pressurized air in a treatment vessel which contains the liquid. The aeration system is commonly comprised of an air distribution piping system including a main distribution header and submerged lateral pipes to receive air or another gas and apply it to diffusers which are mounted to the lateral pipes. The diffusers discharge the gas into the liquid in the form of bubbles. The highest efficiency aeration is achieved by using fine bubble diffusers such as porous membrane diffusers. However, less expensive coarse bubble diffusers are also used in some applications.

Three types of diffusers are commonly known in the wastewater treatment industry, including, (1) disc diffusers, such as those sold under the FlexAir® Disc name, (2) tubular diffusers, such as those sold under the FlexAir® Magnum™ name and (3) panel diffusers, such as those sold under the FlexAir® MiniPanel™ name. These diffusers systems are pipe-mounted systems, meaning that they include diffuser bodies mounted to the lateral pipes. The diffuser bodies are separate and apart from the lateral pipes. They are configured as individual bodies and then mounted to the lateral pipes.

Disc diffuser systems typically include a plurality of rigid circular diffuser bodies or holders mounted to the top of each lateral pipe. A perforated, flexible disc-shaped membrane is secured to the top of each diffuser body by a ring securing the peripheral edge of the membrane to the rim of the diffuser body. Each diffuser body includes a backer plate on which the membrane lies flat until gas is applied. When gas is applied to the diffuser body, the membrane is expanded and its perforations open to discharge gas in the form of fine bubbles. When the gas pressure is relieved, the membrane collapses on the backer plate and creates a seal that prevents liquid from leaking into the diffuser body.

Tubular diffuser systems typically include a plurality of rigid tubular diffuser bodies mounted to each lateral pipe in an orientation perpendicular to the lateral pipes. The tubular diffuser bodies may be screwed or otherwise mounted to extend horizontally perpendicular from the left and right sides of the lateral pipe. A perforated, flexible tubular membrane is positioned over each tubular diffuser body. Clamps may be used to secure the membrane to the diffuser body. When gas is applied to the diffuser body, the membrane is expanded and the perforations open to discharge gas in the form of fine bubbles. When the gas pressure is relieved, the membrane collapses on to the diffuser body and creates a seal that prevents liquid from leaking into the diffuser body. An example of a tubular diffuser of this type is found in U.S. Pat. No. 4,960,546.

Panel diffuser systems make use of a membrane bonded or otherwise secured to a frame which provides a plenum beneath the membrane. The membrane typically has perforations arranged in rows for discharging gas supplied to the plenum. Panel diffusers are functionally similar to disc diffusers and differ principally in that they have a rectangular horizontal projected geometry rather than a round disc shape as is the case with a disc diffuser.

Although the aforementioned diffuser systems function well for the most part, they are not wholly free of problems. They each involve a large number of parts thereby increasing their complexity, cost and maintenance requirements and decreasing their reliability.

Another shortcoming of currently known aeration systems involves the ability to remove and replace a single section or pipe located in the system. Aeration systems utilizing conventional mechanical couplers require an entire series of lateral pipes to be pushed apart in order to remove one pipe from within the series and then pushed back together once the pipe has been replaced. An individual lateral pipe cannot be removed and replaced without disturbing the adjacent pipes to which it is connected.

In practice, the most efficient aeration systems provide a relatively large area of perforated membrane and a relatively low amount of air flow per membrane. However, the aforementioned diffuser systems are often unable to achieve a high degree of efficiency primarily because, due to design and cost constraints, they are unable to achieve a relatively large area of perforated membrane as compared to the total surface area of the floor of the vessel in which they are installed.

An additional limitation for the size of the treatment vessel has been the length to which the diffuser system's lateral pipes could extend. As the temperature of the liquid in which the aeration system is located (or ambient temperature when the vessel is drained) varies, the system's lateral pipes expand and contract in length. The amount of linear expansion and contraction is described generally by the following:

$$\Delta L = \alpha \times L \times \Delta T$$

$\Delta L$=pipe's change in length
$\alpha$=coefficient of linear expansion of pipe's material
$L$=pipe's length
$\Delta T$=change in temperature As set forth above, the amount the pipe changes in length ($\Delta L$) is directly proportional to the pipe's length ($L$). Thus, the longer the pipe, the more its length will change as a result of the varying of the temperature of the liquid in which it is submersed. Securing a lateral pipe fixedly at both ends or along its length results in force on the pipe and the brackets or mounts holding the pipe in place as the pipe expands and contracts. The pipe may bow and/or crack during the expansion and contraction. Additionally, the brackets or mounts holding the pipe may become bent or broken under the force. The maximum length of an unsupported span of pipe is limited by the pipe's deflection and, thus, couplers or supports are required in the use of normal sized aeration systems.

Thus, a need exists for a simplified aeration diffuser system having diffusers that are integral with the lateral pipes and not separate and apart therefrom. A need also exists for an aeration system wherein individual sections or pipes within the system can be removed and replaced without disturbing the adjacent sections or pipes. A need additionally exists for an aeration system capable of providing a large area of perforated membrane and a low amount of air flow per membrane.

A need further exists for aeration system that can be of any desired length and not having a length dependent on mitigating the effects of the expansion and contraction of the lateral pipes therein. A need further exists for an aeration system wherein individual sections or pipes within the system can be removed and replaced without disturbing the adjacent sections or pipes.

SUMMARY OF THE INVENTION

The present invention involves the provision of a coupling assembly for sealingly joining end portions of two adjacent aeration pipes. The coupling assembly includes first and second saddle sections, a deformable gasket and at least one fastening device. The coupling may optionally include a base for mounting the coupling to the floor of a vessel.

The saddle sections are sized and shaped to cooperate to extend closely and substantially fully around the end portions of the pipes. The saddle sections can be generally arc-shaped and include external threads formed proximate their ends for engaging with the threads of an internally threaded ring.

The gasket is designed for directly contacting the outer surfaces of the pipes while optionally being disposed between the saddle sections and the pipes for providing a generally airtight seal between the pipes. The gasket may be in the form of a sleeve and include radially outwardly extending annular collars or ribs adapted for engaging recesses or grooves defined in the inner surfaces of the saddle sections for retaining the gasket in position with respect to the saddle sections.

The fastening device is adapted for holding the saddle sections together and retaining the gasket in generally sealing relationship with the end portions of the pipes. The fastening device may be suitable for holding the saddle sections together and retaining the gasket in generally sealing relationship with the end portions of the pipes in a manner such that the end portions of said pipes may move with respect to the coupling assembly when the pipes expand and contract in length. In one embodiment, the fastening device comprises two internally threaded rings sized and shaped for being applied to threaded ends of the saddle sections for holding the saddle sections together.

The present invention also involves the provision of a wastewater aeration system that includes at least two lateral pipes each having first and second ends, at least one diffuser coupled to one of the lateral pipes, a deformable gasket for sealingly joining the lateral pipes to one another and a support for holding at least one of the lateral pipes in place.

The lateral pipes are hollow and may each include a plurality of ports defined therein for discharging gas therefrom. The lateral pipes may also each have a flexible membrane sleeved closely around them having perforations through which gas is discharged through the membrane into the wastewater in the form of bubbles.

Each support has at least two clamp members for holding at least one of the ends of the lateral pipe in place. The clamp members are movable with respect to the support, such that at least one of that lateral pipes may be removed from a series of lateral pipes and replaced without substantially moving any adjacent lateral pipes.

Finally, the present invention is involves the provision of an aeration system for treating liquid contained in a vessel, the aeration system including a header pipe and a plurality of lateral pipes functioning as diffusers. Pressured gas is supplied to the header pipe and distributed to the lateral pipes. The lateral pipes are coupled to the header pipe and each have one or more tubular diffuser membranes sleeved directly therearound, wherein the diffuser membranes are adapted for discharging the gas into the surrounding liquid. At least a portion of the lateral pipes may be connected to one another in series.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views:

FIG. 8 is a schematic side view of an aeration system having a membrane with perforations on its upper and lower halves extending continuously from one end of the membrane to the other in accordance with one embodiment of the present invention;

FIG. 9 is a schematic side view of an aeration system having a membranes with perforations on its upper half extending continuously from one end of the membrane to the other in accordance with one embodiment of the present invention;

FIG. 11 is a schematic side view of an aeration system having multiple spaced apart membranes on each pipe in accordance with one embodiment of the present invention;

DETAILED DESCRIPTION OF THE INVENTION

Figure 1:
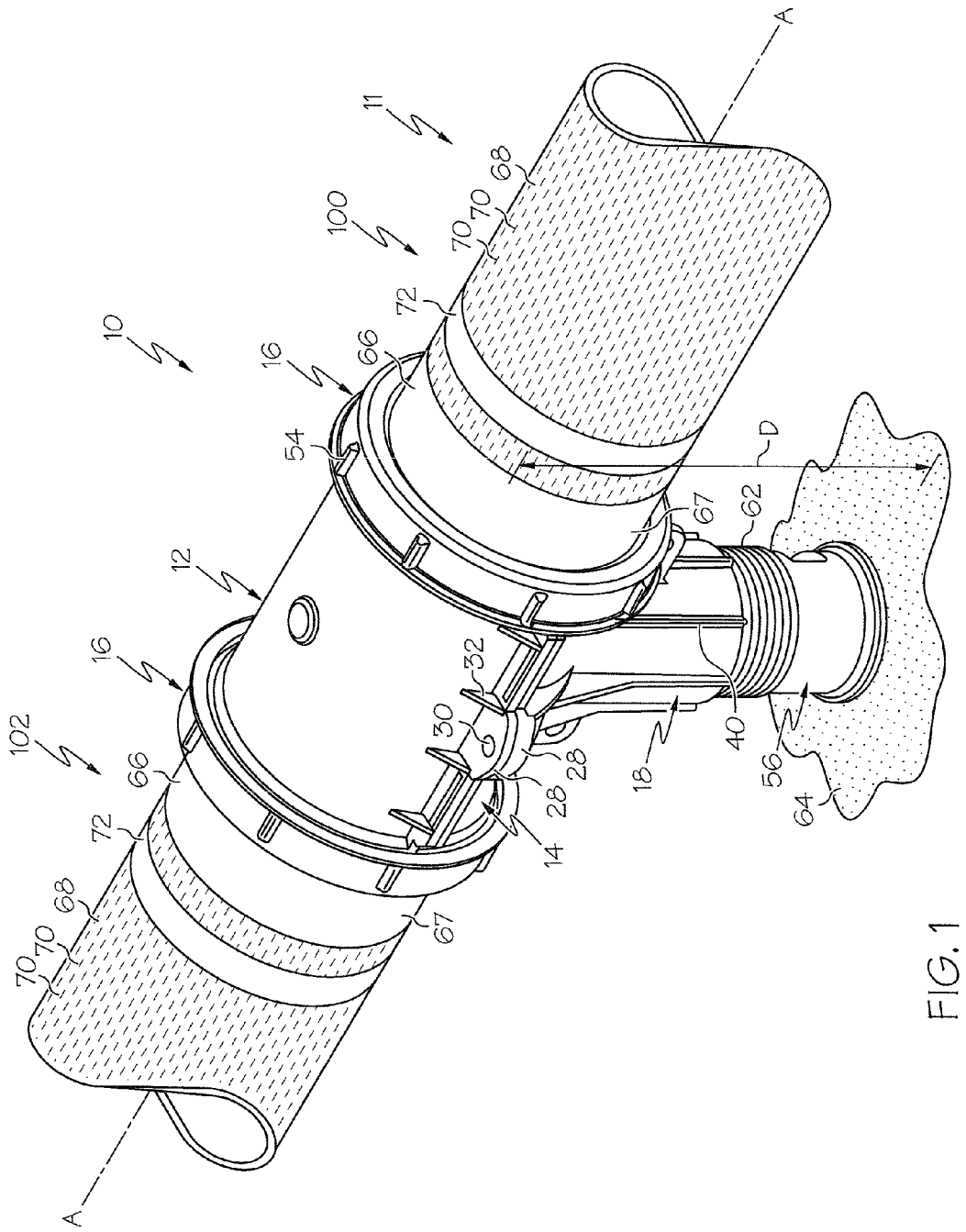
FIG. 1 is a side perspective view of a coupling for sealing joining end portions of two adjacent pipes in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Referring to the FIG. 1, numeral 10 generally designates a coupling assembly for sealing joining the end portions of two adjacent lateral pipes 66 that extend horizontally generally along the bottom of a treatment vessel. The coupling assembly 10 may be of a split configuration and include first and second clamp members or saddle sections 12 and 14 that are sized and shaped to cooperate and extend around end portions of the pipes 66. While the saddle sections 12 and 14 are illustrated as having a generally semi-circular or arc-shaped cross-section, it will be understood that they may take other shapes, such as generally oval, triangular, rectangular, oblong or any other suitable shape, in order to closely and fully extend around the end portions of the pipes 66. When the saddle sections 12 and 14 are assembled, as shown in FIG. 1, they form a longitudinal axis A-A.

Figure 2:
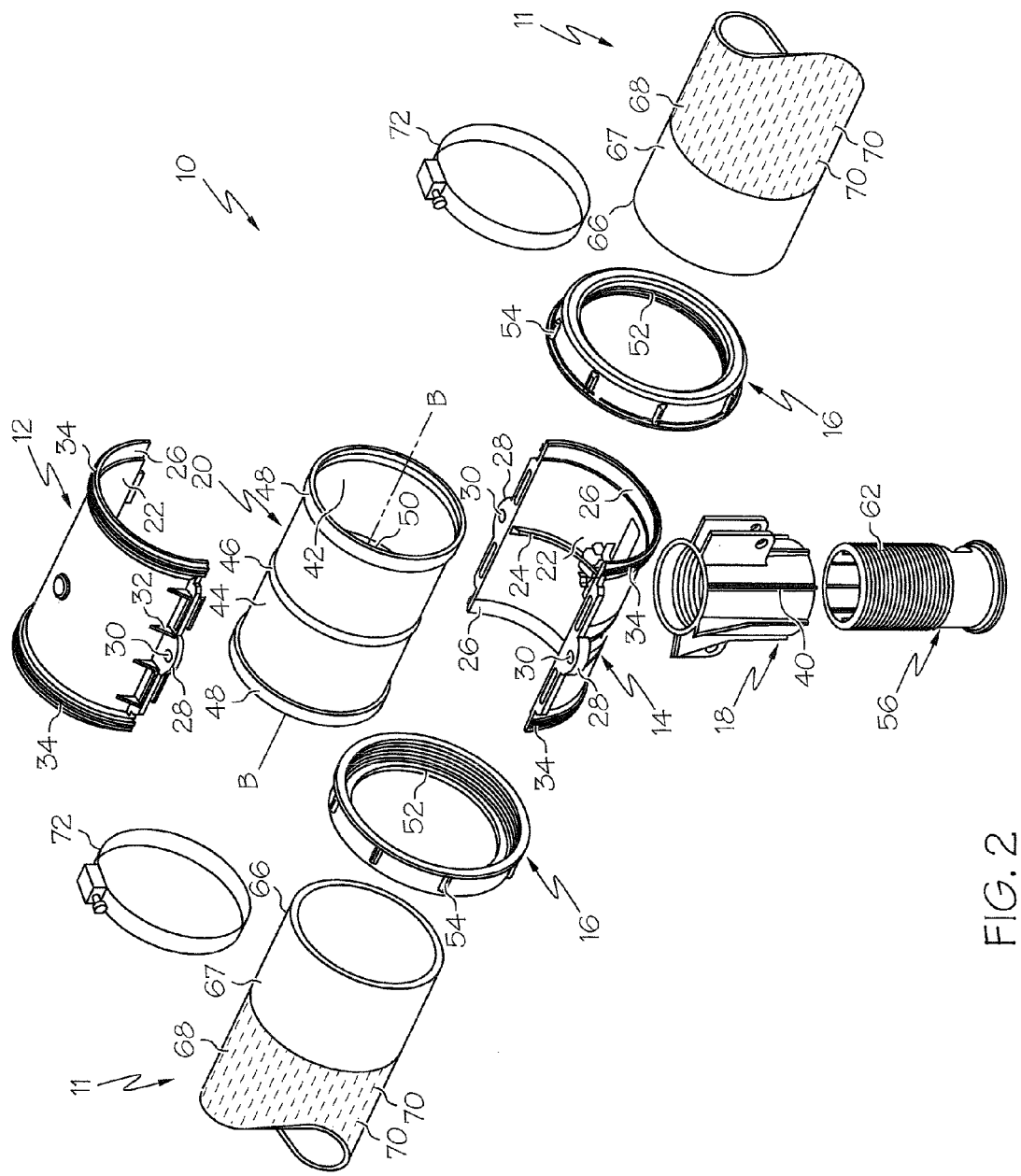
FIG. 2 is an a exploded perspective view generally of the coupling of FIG. 1 in accordance with one embodiment of the present invention.
Figure 3:
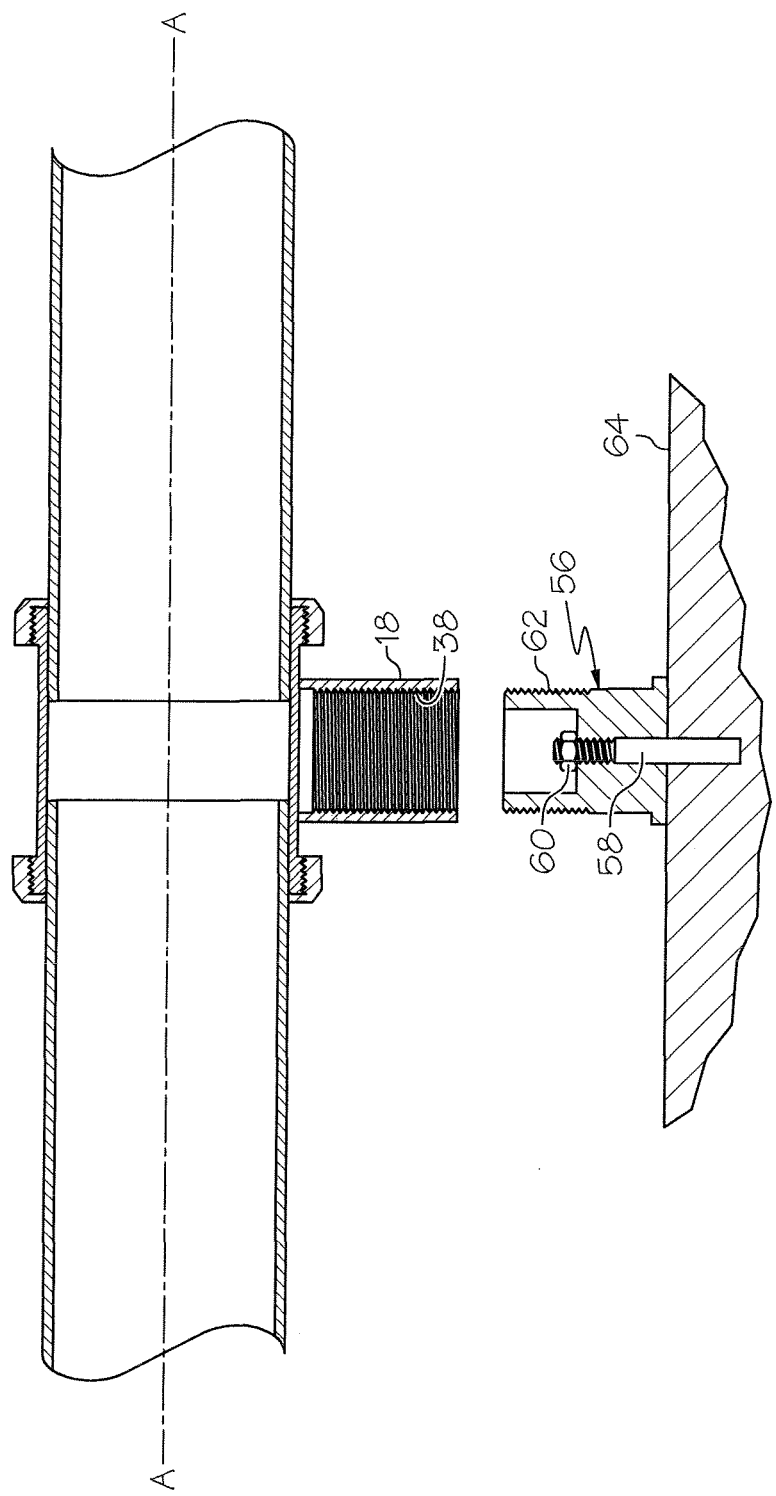
FIG. 3 is a schematic sectional view of a coupling having a base adapted for mounting to an anchor post in accordance with one embodiment of the present invention.

The saddle sections 12 and 14 may be held together by one or more fastening devices. As illustrated in FIGS. 1 and 2, the saddle sections 12 and 14 are held together by rings 16 that are sized and shaped for being applied to the ends of the saddle sections 12 and 14. Rings 16 may be of any suitable form, including internally threaded rings, bands or commonly-known hose clamps. As depicted in FIG. 2, the rings 16 have internal threads 52 that mate with external threads 34 formed into the ends of the saddle sections 12 and 14. The rings may also include ribs 54 in order to provide grip as the rings 16 are being rotated. Other fastening devices may be included in combination with, or separate from, the rings 16. Tabs or lugs 28 may extend from the saddle sections 12 and 14 and may each have an hole or aperture 30 defined therethrough adapted for receiving a bolt (not shown) for clamping the saddle sections 12 and 14 together. The lugs 28 may be supported by gussets 32.

Figure 4:
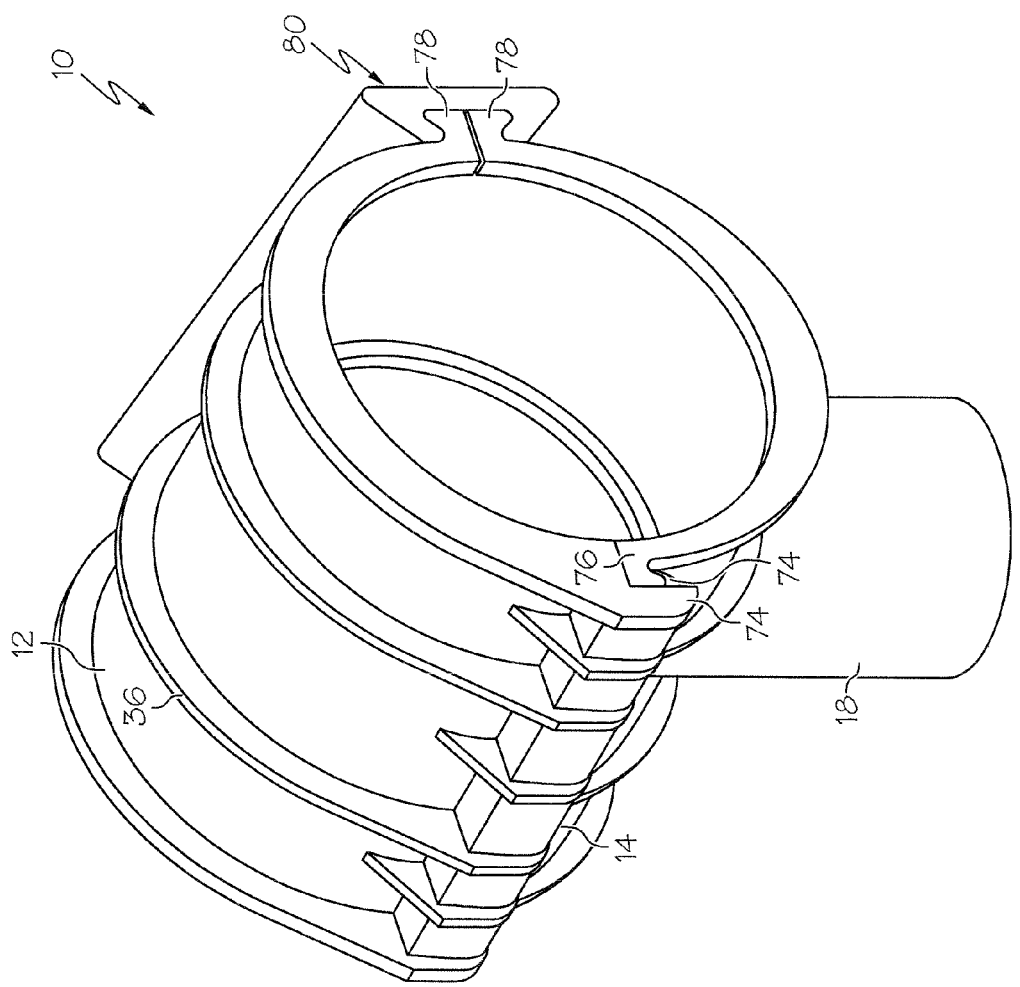
FIG. 4 is a side perspective view of a coupling in accordance with one embodiment of the present invention.

In another embodiment, as demonstrated in FIG. 4, the coupling 10 includes a different type of fastening device. In that embodiment, a lip 76 on one saddle section 14 fits closely within a generally C-shaped flange 74 which is formed on the other saddle section 12. The fit of the flange 74 on the lip 76 provides a hinge about which the two saddle sections 12 and 14 may be closed around the ends of the pipes 66. Opposite the hinge, the saddle sections 12 and 14 are provided with hooks 78. The hooks 78 are secured tightly together by a special wedge-type fastener 80 having a gradually tapering channel which receives the hooks 78. Because of the taper in the channel, the wedge-type fastener 80 can be slid lengthwise along the hooks 76 in order to progressively tighten the hooks 76 against one another to secure the saddle sections 12 and 14 securely on the ends of the pipes 66. As shown, the coupling 10 may additionally include peripheral ribs 36 for supporting the walls of the saddle sections 12 and 14 against hoop stress.

Figure 5:
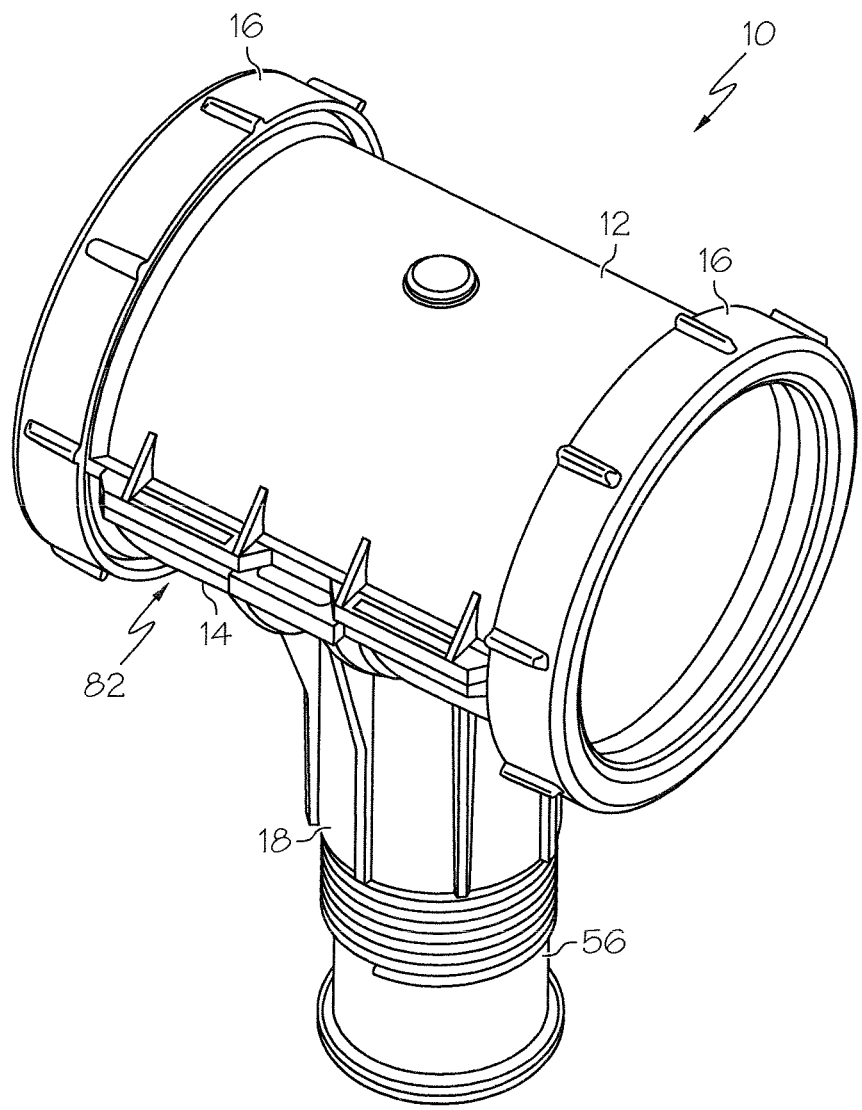
FIG. 5 is a side perspective view of a coupling in accordance with one embodiment of the present invention.
Figure 6:
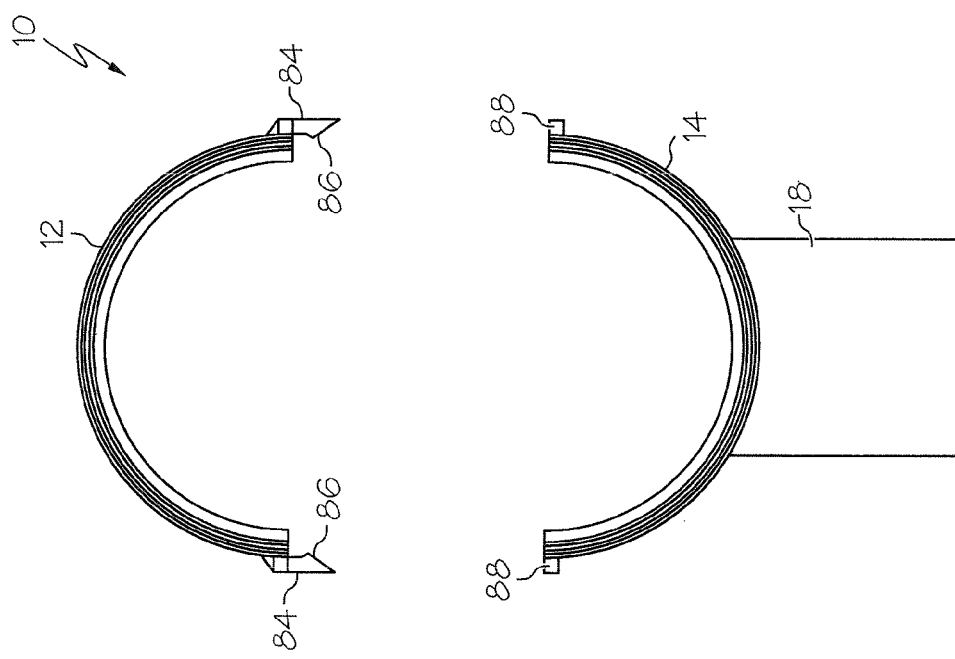
FIG. 6 is a schematic sectional view generally of the coupling shown in FIG. 5 in accordance with one embodiment of the present invention.

In a further embodiment, as demonstrated in FIGS. 5 and 6, the coupling 10 includes another type of fastening device. In that embodiment, an interlock connection 82 is utilized. Tabs 84 extending from one saddle section 12 have barbs 86 protruding therefrom for snappingly engaging slots 88 defined within lugs extending from the other saddle section 14.

In order to provide a seal within the coupling 10, which effectively prevents the escape or leakage of gas from the coupling 10 or the leakage of water into the pipes 66, a gasket 20 is provided to engage the outer surfaces 67 of the pipes 66. The gasket 20 serves two primary functions, namely, to seal the ends of two opposing pipes 66 together and to convey gas between the pipes 66 in combination with the coupling 10. As illustrated in FIG. 2, the coupling 10 includes a deformable gasket 20 for directly contacting the outer surfaces 67 of the end portions of the pipes 66. The gasket 20 may generally be in the form of a tube, sleeve, cylinder, o-ring or any other configuration suitable for creating a fluid-tight joint. The gasket 20 may take on the cross-sectional shape of the out surface 67 of the pipes 66 and, thus, may have a generally circular, oval, triangular, rectangular, oblong, or profiled cross-sectional shape, for example.

The gasket 20 may be formed of any suitable elastomeric or rubber-like material or any other material suitable for creating a seal when applied to the end portions of the pipes 66 by the coupling 10. The inner surface 42 of the gasket 20 may have a profile or circumference that is substantially equal to the outer profile or circumference of the pipes 66 such that surface-to-surface contact between gasket inner surface 42 and pipe outer surface 67 is maintained. When the coupling 10 is assembled, the gasket 20 is disposed between the saddle sections 12 and 14 and the pipes 66 for providing a generally airtight seal between the pipes 66.

In one embodiment, the gasket 20 is a cylindrical elastomeric sleeve having first and second ends and inner and outer surfaces 42 and 44. The ends of the gasket 20 may include radially outwardly extending annular collars 48 adapted for engaging recesses 26 formed into the ends of the saddle sections 12 and 14. When seated within the recesses 26, the collars 48 assist in retaining the gasket 20 in position with respect to the saddle sections 12 and 14 along longitudinal axes A-A and B-B. The gasket 20 may also include a radially outwardly extending rib 46 adapted for engaging a channel or groove 24 defined into the inner surfaces 22 of the saddle sections 12 and 14. Like the collars, the rib 46 assists in retaining the gasket 20 in position within the saddle sections 12 and 14. Further, in some embodiments, the design will include an anti-rotation feature. In such an embodiment, a key or plug (not shown) is inserted into, molded into or attached to the pipe 66 such that it protrudes from the outer surface 67 of the pipe 66. The plug engages a groove (not shown) defined in the gasket 20 and/or one or both of the saddle sections 12 and 14 to prevent the pipe from rotating.

The coupling 10 is designed to retain the gasket 20 in generally sealing relationship with the end portions of the pipes 66 in a manner such that the end portions of the pipes 66 may move with respect to the coupling 10 in the direction of longitudinal axis A-A when the pipes 66 expand and contract in length. When assembled, the overlap between each pipe 66 and the gasket 20 is such that each pipe 66 may expand in length when it is relatively warmer and contract in length when it is relatively cooler, while maintaining a substantial sealing contact with the gasket 20. The amount of overlap between each pipe 66 and the gasket 20 is such that the two adjacent pipes 66 will never, under conceivable operating conditions, come into contact with one another when expanded in length nor will the pipes 66 slip out of the gasket 20 when contracted in length. The gasket 20 may further include an internal rib 50 for assisting the installers assembling an aeration system utilizing the couplings 10. In order to ensure that each pipe 66 is inserted the desired distance into the coupling 10, the installer may push the pipe 66 into the coupling 10 until it contacts the internal rib 50 and then back the pipe 66 out of the coupling 10 a certain distance.

As illustrated in figures, the coupling 10 includes a base 18 extending from one of the saddle sections 12 or 14. The base 18 is adapted for retaining the coupling in position with respect to the basin floor 64. The base 18 may be adapted for being removably connected to a post 56 or other object anchored to the basin floor 64. The post 56 may be anchored to the basin floor 64 using an anchor bolt 58 set into the floor 64 and a nut 60 for retaining the post 56 to the floor 64.

As shown, the base 18 and post 56 have a threaded connection wherein the base 18 includes internal threads 38 that mate with external threads 62 of the post 56. However, it will be understood that the base 18 may have the external threads and the post 56 may have the internal threads. This threaded connection allows the vertical distance D between the center of the coupling 10 (i.e., longitudinal axis A-A) and the basin floor 64 to be adjusted by simply rotating the coupling 10. The base 18 can include ribs 40 in order to provide grip as the base 18 is rotated. In another embodiment, the connection between the base 18 and post 56 is not a threaded connection. For example, the base 18 may be inserted into or around the post 56 and a pin, bolt or other suitable fastener (not shown) may be used to maintain the connection. In such a case, the base 18 and post 56 may include multiple apertures at varying heights so that the distance D between the center of the coupling 10 and the basin floor 64 may be adjustable.

As demonstrated in FIG. 2, the base 18 and/or post 56 can be detachable from the saddle section 14. It will also be understood that, in some cases, the coupling 10 will not include a base 18 or post 56.

It will be appreciated by one skilled in the art that the coupling 10 may be used with any type of aeration or diffuser system. For example, the coupling 10 may be used to join lateral pipes to which disc diffusers, tubular diffusers, panel diffusers or any other type of diffuser is mounted. The coupling may also be used in connection with an aeration system wherein, as described below, a diffuser membrane 68 is sleeved directly around the lateral pipe 66. Additionally, the coupling 10 may be used in applications other than aeration systems where two or more pipes are coupled together, including but not limited to, in water pipes, sewage pipes, plumbing systems, pools and aquatic facilities, HVAC systems or any other application where two or more pipes may be coupled together.

Moving now from the coupling 10 to the overall aeration system, lateral pipes 66 are supplied with air or another gas from a submerged manifold or subheader 90 to which gas is supplied by a fan or blower (not shown). Traditionally, once the gas is supplied to each lateral pipe, it is then transferred from the pipe to a separate diffuser, which may take the form of a disc diffuser, tubular diffuser or panel diffuser as described above. Then from that separate diffuser, the gas is distributed to the surrounding liquid. In such a case, the lateral pipes are used solely to transport gas to the diffusers and structurally support the diffuser assembly. The lateral pipes in such a case are not used as diffusers or diffuser bodies themselves.

However, in the present invention, the pipes 66 are configured such that the gas may be distributed to the surrounding liquid directly from the pipes 66. Such an aeration system enables for maximum "floor coverage." Floor coverage is defined by the net perforated area of the aeration system divided by the total area of the floor in the treatment vessel. Depending upon the particular application, the space or distance S between the lateral pipes 66 may be variable. In one embodiment, the distance S is such that the pipes 66 are nearly touching one another. In other embodiments, the distance S is greater. As such, the present invention may provide floor coverage of between about 3% and 80% or more. In one embodiment, the floor coverage is between about 7% and 30%. Thus, the system of the present invention is capable of providing a large area of perforated membrane and a low amount of air flow per membrane. Additionally, the separate diffuser components, as required in other known systems, are not necessary, as the pipes 66 themselves are functioning as the diffusers.

As shown, one or more membranes 68 are sleeved directly around each rigid pipe 66. The pipe 66 may be constructed of PVC, UPVC, CPVC, polyethylene, polypropylene, stainless steel, carbon steel, fiberglass, combinations thereof or any other material suitable for a specific application. As depicted in the figures, the pipe 66 has a generally circular cross section and may have a nominal diameter of between about two inches (2") and eight or more inches (8"+). However, it will be understood that at least a portion of each pipe 66, if not the entire length of the pipe 66, may have a non-circular cross section. In one case, only the center section of the pipe 66 has a non-circular cross section, so that more commonly available circular connection members may be utilized on the ends of the pipe 66. The non-circular geometry may be created by an extrusion machine or may be produced by heating a circular pipe 66 and shaping it after extrusion. In one embodiment, the top portion of the pipe 66 may be generally flat or include a relatively larger radius. In other embodiments, the cross section of the pipe may be generally oval, triangular, rectangular, oblong or another other suitable shape.

Figure 7:
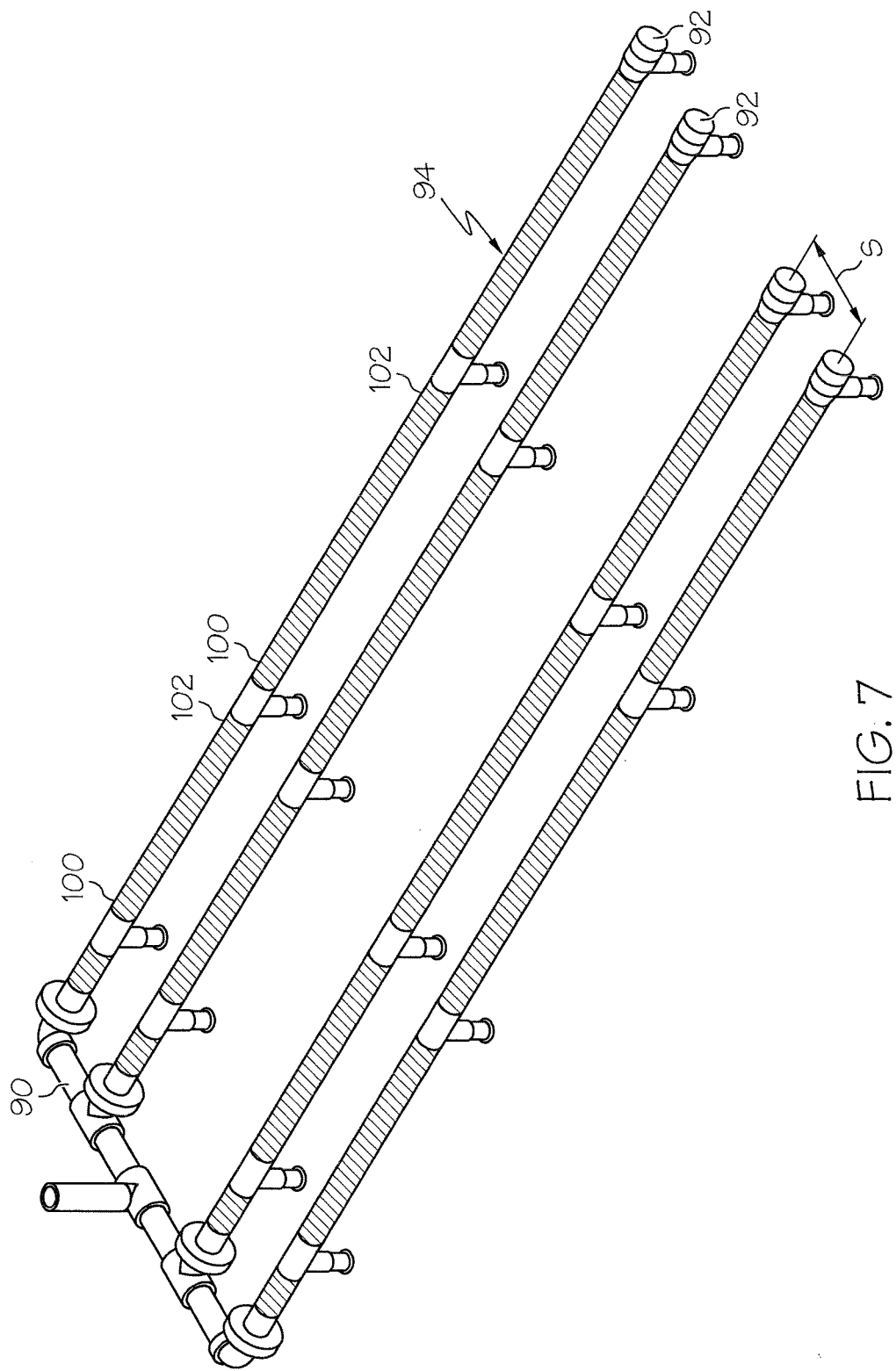
FIG. 7 is a top perspective view of an aeration system in accordance with one embodiment of the present invention.
Figure 10:
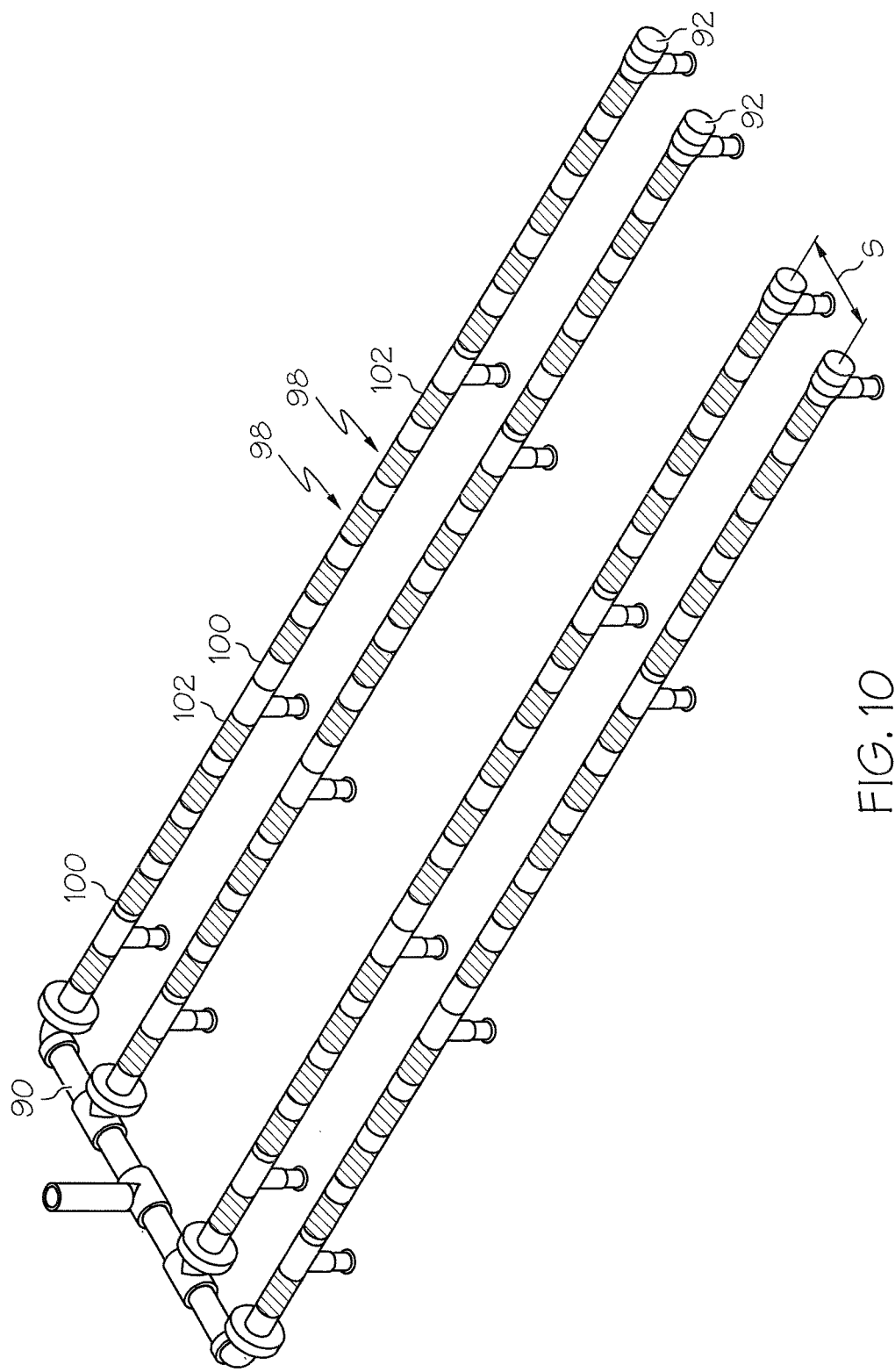
FIG. 10 is a top perspective view of an aeration system having multiple spaced apart membranes on each pipe in accordance with one embodiment of the present invention.
Figure 12:
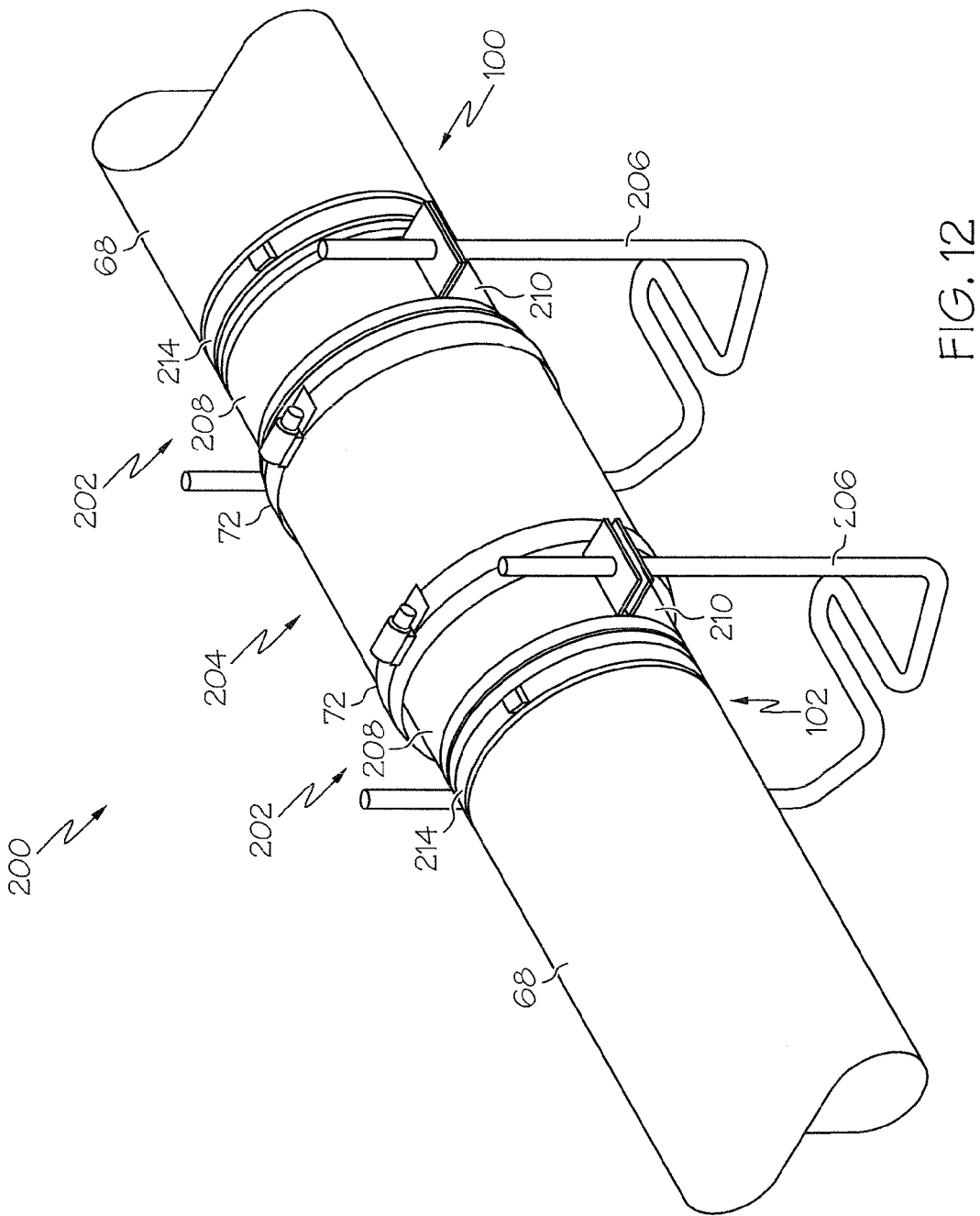
FIG. 12 is a side perspective view of another coupling for sealing joining end portions of two adjacent pipes in accordance with one embodiment of the present invention.
Figure 13:
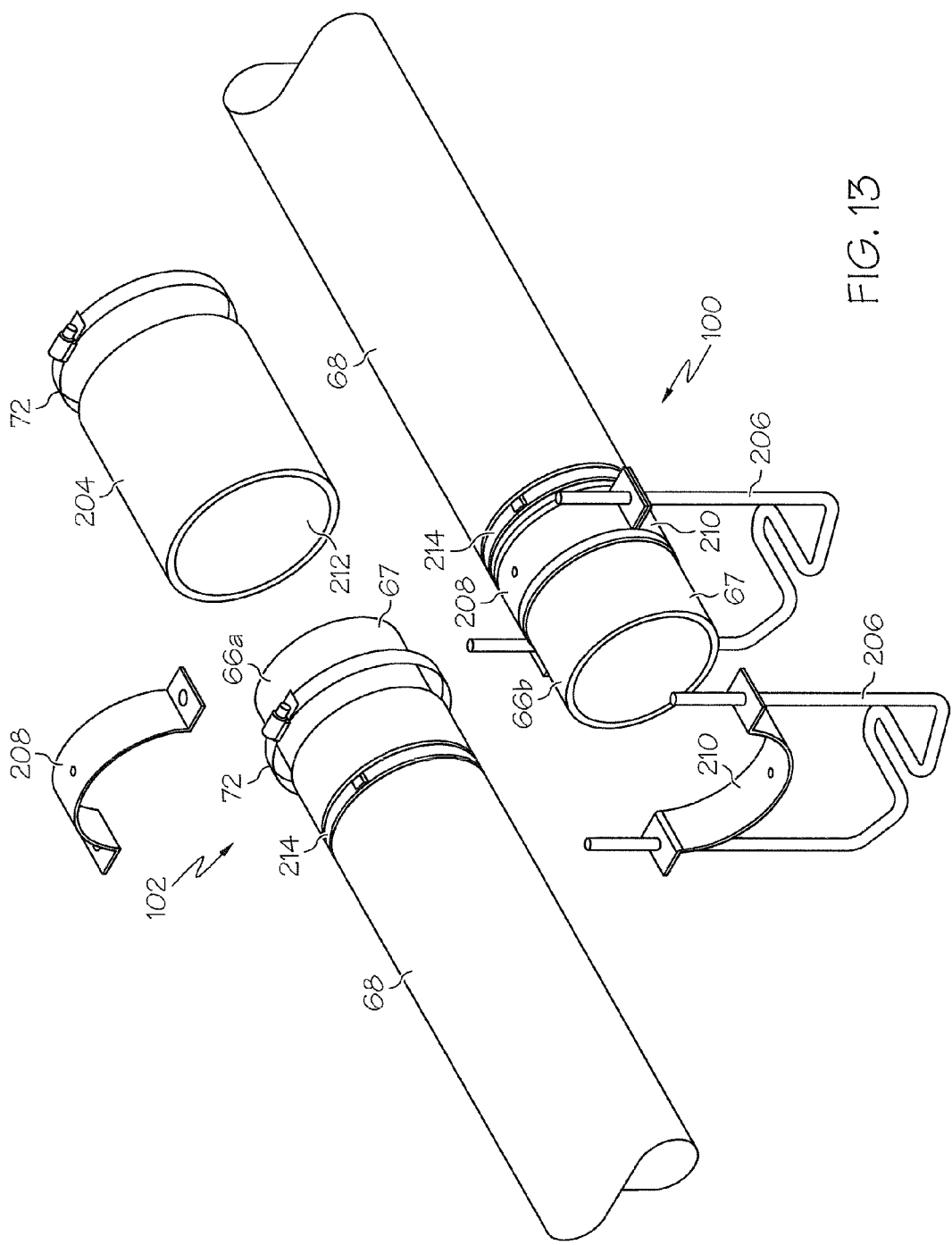
FIG. 13 is an a exploded perspective view generally of the coupling of FIG. 12 in accordance with one embodiment of the present invention.
Figure 14:
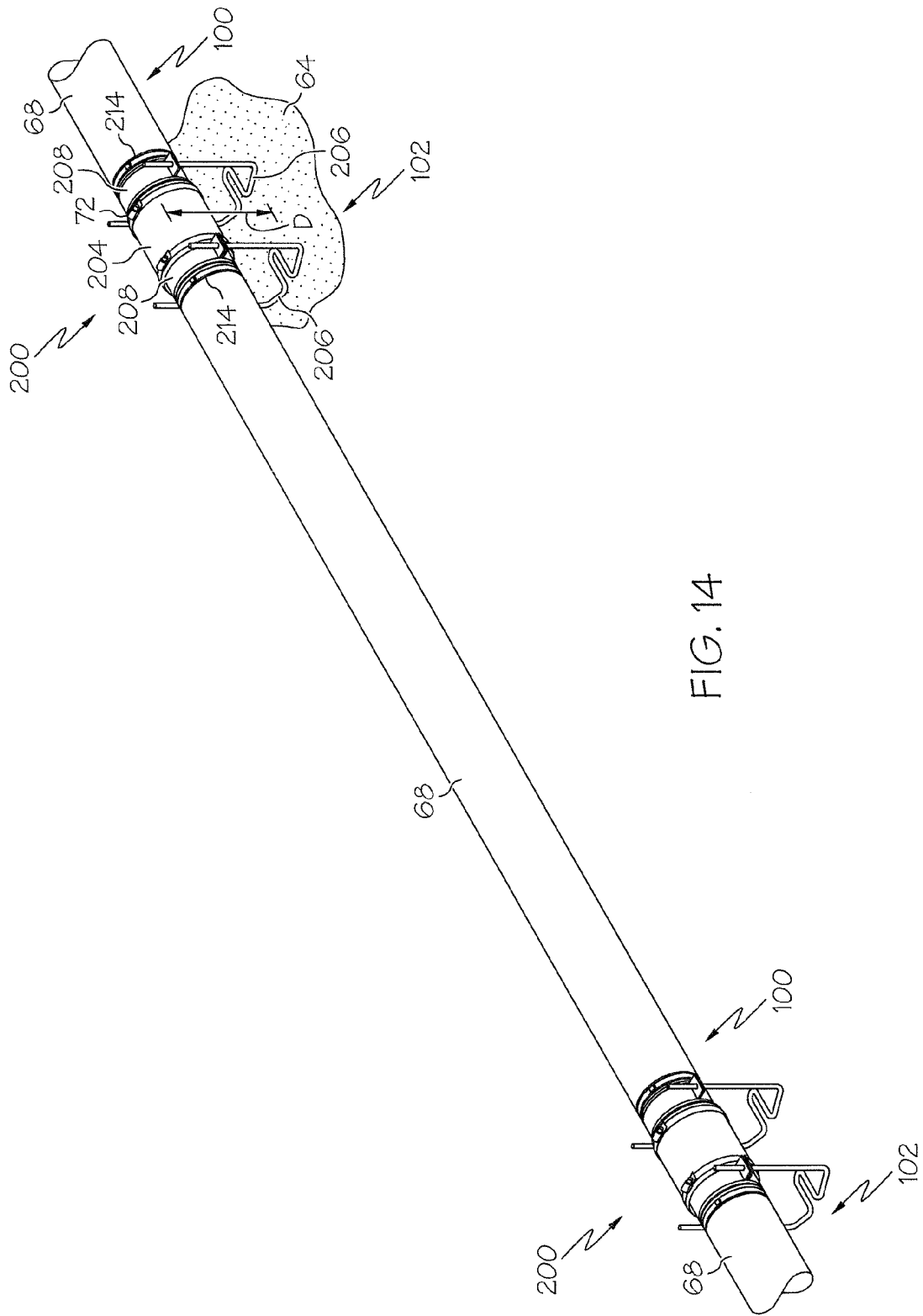
FIG. 14 is a side perspective view of a portion of an aeration system incorporating generally the coupling of FIG. 12 in accordance with one embodiment of the present invention.

The one or more membranes 68 may be secured in place to the pipe 66 by bands or hose clamps 72 applied to the opposite end portions of each membrane 68, or by other suitable means. In the embodiments shown in FIGS. 7-9, a single membrane 94 or 96 is applied to each pipe 66 and extends around the pipe 66 along substantially its entire length. The embodiments may be configured to simulate and take the place of tubular-type or panel-types diffusers. In other embodiments, such as those shown in FIGS. 10-11, a plurality of membranes 98 may be applied to a single pipe 66. These embodiments may be configured to simulate and take the place of disc-type diffusers.

Each pipe 66 is generally hollow and includes a plurality of ports (not shown) defined therein for discharging gas from the pipe 66. The ports, which extend through the pipe wall at spaced locations along the length of the pipe 66, may be located along the top, bottom and/or sides of the pipe 66. In some embodiments, the ports may be located only proximate the top (north pole) of each pipe 66, only proximate the bottom (south pole) of each pipe 66, or may be located proximate both the top and bottom, or anywhere therebetween.

The membrane 68 is constructed of a flexible material such as rubber, neoprene, polyurethane, EPDM, silicone, PTFE-type polymers, Viton®, polyethylene, combinations thereof or any other suitable natural or synthetic material having the requisite flexibility and structural characteristics. The membrane 68 is provided with a plurality of perforations 70 which, when there is no gas pressure applied, are closed due to the collapsing of the membrane 68 closely onto the outer surface 67 of the pipe 66. When gas is applied to the inside of the membrane 68, the gas pressure expands the membrane 68 and deflects it outwardly such that the perforations 70 open and discharge the gas into the surrounding water or other liquid in the form of gas bubbles. The discharge of the gas in small bubbles enhances the efficiency of the transfer of gas to the liquid and thus enhances the efficiency of the diffusion process. The perforations 70 may take the form of one dimensional or two dimensional slits, pin holes or any other suitable punctures or cuts made in the membrane 68. As illustrated in FIGS. 1 and 2, the perforations 70 may take the form of slits that may be arranged in parallel rows of slits. Each row may extend parallel to the longitudinal axis of the membrane 68 and may include a plurality of slits that may be arranged end to end and spaced apart from one another. A plurality of such adjacent rows may form a pattern of perforations 70 or slits.

Like the ports in the pipe 66, the perforations 70 may be located proximate, the top, bottom and/or sides of the membrane 68. As schematically demonstrated in FIGS. 7 and 8, the perforations 70 may generally be located 360° around the membrane 94. As schematically demonstrated in FIGS. 9-11, the perforations 70 may generally be located substantially continuously only proximate a top half of the membranes 96 and 98. It will be understood that the hash lines in FIGS. 7-11 are provided to designate the location of the perforations and do not necessarily represent the orientation, size or style of the perforations.

In other embodiments, the perforations 70 are placed in intermittent sections or patches over the length of the membrane 66. For example, the plurality of membranes 98 on each pipe 66 depicted in FIGS. 10 and 11, could be replaced with a single membrane extending substantially the entire distance of the pipe 66 and having intermittent sections of perforations 70 so as to replicate the function of a disc diffuser. It will be appreciated that the portions of each membrane 68 located proximate the ports in the pipe will include non-perforated zones.

As set forth above, the lateral pipes 66 may be connected to one another in series to form a diffuser assembly having a desired length. Virtually any number of pipes 66 may be assembled in order to reach a desired overall length. The pipes 66 are supported generally horizontally a distance D above the basin floor 64 by a coupling 10 or other support allowing the pipes 66 to move with respect to the coupling 10 or support along a longitudinal axis as the pipes 66 expand and contract.

The pipes 66 have first and second ends 100 and 102 wherein the first end 100 of a first pipe 66 may be coupled with a header pipe 90. The second end 102 of the first pipe 66 is sealingly joined with the first end 100 of a second pipe, and so on. The second end 102 of the last pipe 66 in the series of pipes 66 may be sealed with a cap 92. In one embodiment, the cap 92 is adapted for being restrained within a coupling 10 by a threaded ring 16. Such a coupling 10 will be restrained in place on the end of the last pipe 66 in the series in order to prevent blow off caused by the internal operating pressure of the system.

In one embodiment, the first and second ends 100 and 102 of adjacent pipes 66 are sealingly joined with the coupler 10. The coupler 10 enables one pipe 66 to be removed and replaced from a series of pipes 66 without having to remove or significantly disturb the adjacent pipes 66. When it is desired to remove and replace a single pipe 66, the fastening devices (e.g., rings 16) may be unscrewed or otherwise removed from the couplings 10 holding the pipe 66 in place. The top saddle section 12 can then be lifted from the remainder of the coupling 10. Once the top saddle section 12 is removed from each coupling 10 holding the ends 100 and 102 of the pipe 66, the sleeve gasket (if applicable) can be slid from the pipe 66 and the pipe 66 can be removed from the series of pipes 66 by lifting it out of the open coupling 10. A replacement pipe 66 may be then added to the series in replacement of the removed pipe 66.

Turning to another embodiment, as depicted in FIGS. 12-15, like the embodiments described above, one pipe 66b may be removed and replaced from a series of pipes 66a, 66b and 66c without having to remove or significantly disturb the adjacent pipes 66a and 66c. In that embodiment, a coupling assembly 200 is employed. Each coupling assembly 200 includes two clamp assemblies 202 and a sleeve-type gasket 204. In the case of two joined adjacent pipes (66a and 66b, for example), one clamp assembly 202 is placed proximate the first end 100 of one pipe 66b and one clamp assembly 202 is placed proximate the second end 102 of the other pipe 66c. The gasket 204 is provided to engage the outer surfaces 67 of the pipes 66a and 66b.

As illustrated in FIGS. 12-15, the clamp assemblies 202 are adapted for supporting the pipes 66a, 66b and 66c generally horizontally a distance D above the vessel floor 64. Each clamp assembly 202 may include a stand or bracket 206 having two threaded posts, a clamp member or first saddle section 208 and a second clamp member or saddle section 210. It will be understood that alternative suitable clamp assemblies suitable for supporting the pipes 66a, 66b and 66c may be employed. In one embodiment, the bracket 206 is replaced with two threaded anchor bolts extending upwardly from the vessel floor 64. The clamp assembly 202 may include a nut or other suitable fastening device under the second (lower) saddle section 210 and a nut or other suitable fastening device above the first (upper) saddle section 208 in order to clamp the pipes and retain them in place.

The gasket 204 is a sleeve-type gasket and may be generally similar to gasket 20 described above. The gasket 204 includes an inner surface 212 having a profile that is substantially similar to the outer profile of the pipes 66a, 66b and 66c such that surface-to-surface contact between gasket inner surface 212 and pipe outer surface 67 is maintained. The gasket 204 may be secured to the pipes 66a, 66b and 66c by hose clamps 72 or other suitable means, such as the bands 214 shown as being applied around the membrane 68. In another embodiment, the seal between the gasket 204 and the pipes is not created by longitudinal compression, but rather is created by an axial compression. In such a case the gasket 204 is sandwiched between the pipes or protrusions extending outwardly from the outer surfaces of the pipes.

Figure 15:
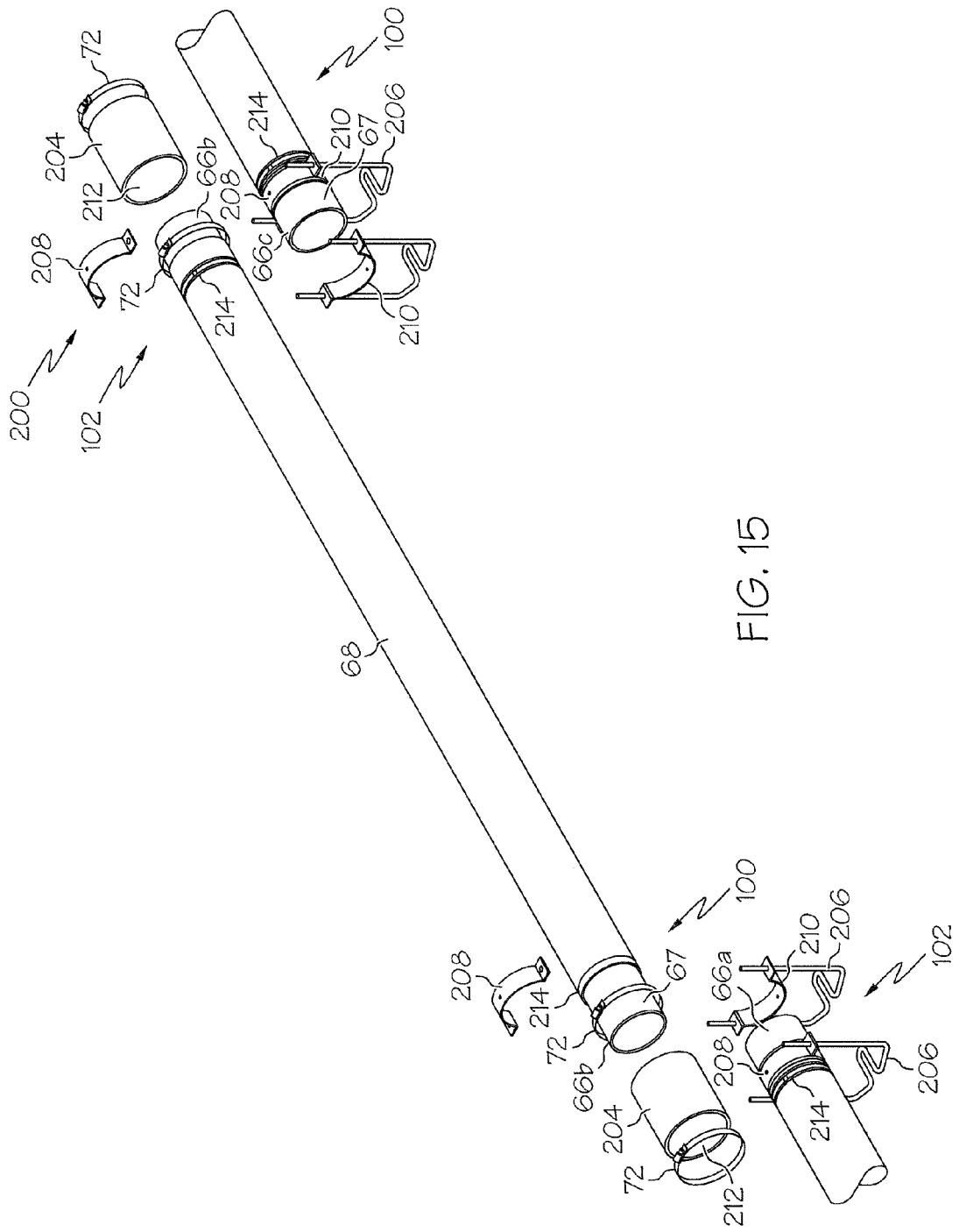
FIG. 15 is an exploded side perspective view generally of the portion of the aeration system shown in FIG. 14 in accordance with one embodiment of the present invention.

As demonstrated in FIG. 15, one pipe 66b may be removed and replaced from a series of pipes 66a, 66b and 66c without having to remove the adjacent pipes 66a and 66c. When it is desired to remove and replace a single pipe 66b, the first saddle section 208 is removed from each clamping assembly 202 holding the pipe 66b. The gaskets 204 are then pulled back so that they are removed from the adjacent pipes 66a and 66c and/or the pipe 66b being removed. Once the pipe 66b has been disconnected from the adjacent pipes 66a and 66c, it may be removed from the series of pipes by lifting it out of the open clamping assemblies 202. A replacement pipe may be then added to the series in replacement of the removed pipe 66b.

Like coupling 10, it will be appreciated by one skilled in the art that coupling 200 may be used with any type of aeration or diffuser system. For example, the coupling 200 may be used to join lateral pipes to which disc diffusers, tubular diffusers, panel diffusers or any other type of diffuser is mounted. The coupling may also be used in connection with an aeration system wherein, as described above, a diffuser membrane 68 is applied directly to the lateral pipes 66a, 66b and 66c. Additionally, the coupling 200 may be used in applications other than aeration systems where two or more pipes are coupling together, including but not limited to, in water pipes, sewage pipes, plumbing systems, pools and aquatic facilities, HVAC systems or any other application where two or more pipes are coupled together.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An aeration system for use in a treatment basin, said aeration system comprising:
   at least two rigid lateral pipes connected to one another in series to form a diffuser assembly having a desired length, said lateral pipes each having first and second ends;
   at least one diffuser coupled to one of said lateral pipes;
   a deformable gasket for sealingly joining said lateral pipes to one another; and
   first and second clamp members for holding at least one of said lateral pipe first and second ends in place, one of said clamp members being movable such that at least one of said lateral pipes may be removed from said series of lateral pipes and replaced without substantially removing any adjacent lateral pipes.

2. The aeration system of claim 1, wherein said lateral pipes are supported horizontally a distance above a floor of said basin floor by a support allowing said pipes to move with respect to said support along a longitudinal axis as said pipes expand and contract.

3. The aeration system of claim 1, wherein said first and second clamp members are semi-cylindrical saddle sections and said lateral pipes are sealingly joined by a coupling assembly which comprises:
   first and second semi-cylindrical saddle sections sized and shaped to cooperate to extend closely and substantially fully around end portions of said lateral pipes, said saddle sections forming a longitudinal axis when assembled together;
   said gasket, wherein said gasket is adapted for directly contacting said surfaces of said end portions of said lateral pipes, said gasket being disposed between said saddle sections and said lateral pipes for providing a generally airtight seal between said lateral pipes; and
   at least one fastening device for holding said first and second saddle sections together and retaining said gasket in generally sealing relationship with said end portions of said lateral pipes in a manner such that said end portions of said lateral pipes may move with respect to said coupling assembly in a direction of said longitudinal axis when said lateral pipes expand and contract in length along said longitudinal axis.

4. The aeration system of claim 1, wherein said lateral pipes are hollow and each includes a wall with a plurality of ports defined therein for discharging gas therefrom.

5. The aeration system of claim 4, wherein said diffuser is a flexible membrane sleeved closely around each said lateral pipe and presenting perforations through which gas from the lateral pipes is discharged through the membrane into the wastewater in the form of bubbles.

6. The aeration system of claim 5, wherein said perforations are in the form of a plurality of slits extending parallel to a longitudinal axis of said membrane, said slits being spaced apart from one another to form a pattern.

7. The aeration system of claim 6, wherein said pattern of slits is positioned substantially continuously across a top half of said membrane.

8. The aeration system of claim 6, wherein said pattern of slits is positioned substantially continuously across both top and bottom halves or opposing sides of said membrane.

9. The aeration system of claim 6, wherein said pattern of slits is positioned intermittently across a top half of said membrane.

10. The aeration system of claim 6 including a plurality of membranes sleeved around each said lateral pipe in a spaced apart orientation.

11. The aeration system of claim 1, wherein the first end of a first lateral pipe is coupled with a header pipe and the second end of said first lateral pipe is generally sealingly joined with the first end of a second lateral pipe.

12. The aeration system of claim 1 further comprising a cap sealingly coupled to the second end of the last lateral pipe in the series.

13. The aeration system of claim 1, wherein said first and second clamp members are first and second saddle sections sized and shaped to cooperate to extend closely and substantially fully around said end portions of said pipes.

14. The aeration system of claim 13, wherein first and second ends of said saddle sections are externally threaded.

15. The aeration system of claim 14 further comprising first and second internally threaded rings sized and shaped for being applied to first and second threaded ends of said saddle sections for holding said saddle sections together.

16. The aeration system of claim 13, wherein first and second ends of said gasket each include a radially outwardly extending annular collar adapted for engaging recesses formed proximate first and second ends of said saddle sections for retaining said sleeve in position with respect to said saddle sections.

17. The aeration system of claim 13, wherein said gasket includes a radially outwardly extending rib adapted for engaging a groove defined in an inner surface of each said saddle section for retaining said sleeve in position with respect to said saddle sections.

18. The aeration system of claim 1, wherein said clamp members are bands or hose clamps.

* * * * *